United States Patent
Satzler

(10) Patent No.: US 6,518,913 B1
(45) Date of Patent: Feb. 11, 2003

(54) APPARATUS AND METHOD FOR LOCATING OBJECTS UNDER A BODY OF WATER

(75) Inventor: Ronald L. Satzler, Princeville, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/554,798

(22) PCT Filed: May 19, 2000

(86) PCT No.: PCT/US00/13837
§ 371 (c)(1), (2), (4) Date: May 19, 2000

(87) PCT Pub. No.: WO01/90775
PCT Pub. Date: Nov. 29, 2001

(51) Int. Cl.$^7$ .......................... G01S 13/88; G01S 13/00
(52) U.S. Cl. ...................... 342/22; 342/27; 342/357.01; 342/357.06; 701/207; 701/213
(58) Field of Search ............... 342/21, 22, 27, 342/28, 75, 192–197, 357.01–357.17; 701/207, 213, 214, 215, 216

(56) References Cited

U.S. PATENT DOCUMENTS

| 3,719,947 | A | * | 3/1973 | Gutton et al. ................. 342/22 |
| 5,019,822 | A | * | 5/1991 | Kirkland ...................... 342/22 |
| 5,384,715 | A | | 1/1995 | Lytton |
| 5,673,050 | A | | 9/1997 | Moussally et al. |
| 5,757,723 | A | | 5/1998 | Weglein et al. |
| 5,796,363 | A | * | 8/1998 | Mast ........................... 342/22 |
| 5,835,054 | A | * | 11/1998 | Warhus et al. ................ 342/22 |
| 5,952,561 | A | | 9/1999 | Jaselskis et al. |
| 6,082,466 | A | | 7/2000 | Gudat |
| 6,094,157 | A | | 7/2000 | Cowdrick |
| 6,246,355 | B1 | * | 6/2001 | Miceli et al. ................. 342/22 |

* cited by examiner

Primary Examiner—Bernarr E. Gregory
(74) Attorney, Agent, or Firm—Blackwell Sanders Peper Martin LLP

(57) ABSTRACT

An apparatus (10) and method adapted for locating objects under a body of water comprising a frame structure (12) and at least one sensor assembly (16) connected thereto. The sensor assembly (16) is pivotally coupled to the frame structure (12) and includes a rigid member (20) and a geographic location system receiver (42) connected thereto. An arm member (22) is connected to the rigid member (20) and an object detection device (38) is associated with the arm member (22). The object detection device (38) is operable to detect a density change indicative of an object under the body of water, said object detection device (38) being further operable to emit a signal (46) indicative of the detection of an object under the body of water relative thereto based density change sensed thereby; and its position is known relative to the position of the GPS receiver (42). The geographic location receiver (42) is operable to emit a signal (50) indicative of the present position of the receiver (42). An electronic controller (48) coupled to both the object detection device (38) and the geographic location receiver (42) is operable to both receive signals (46, 50) therefrom and to output a signal (52) indicative of the location of the object detected under the body of water.

36 Claims, 3 Drawing Sheets

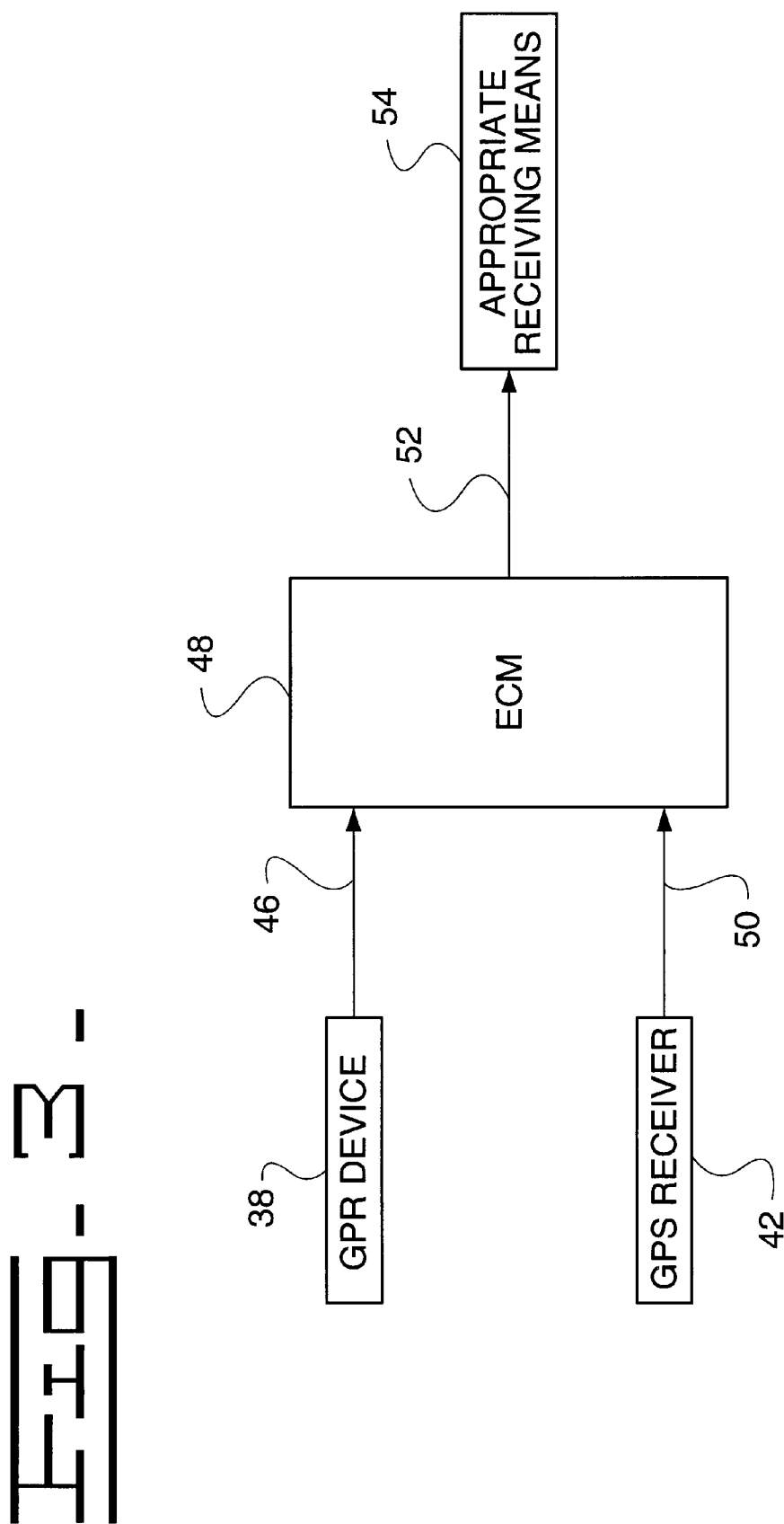

US 6,518,913 B1

APPARATUS AND METHOD FOR LOCATING OBJECTS UNDER A BODY OF WATER

TECHNICAL FIELD

This invention relates generally to marine equipment and, more particularly, to an apparatus and method for locating objects under a body of water.

BACKGROUND ART

Various types of apparatus for conducting dredging operations and removing sediment material from under a body of water are known in the art. Although such apparatus may conduct dredging operations relatively reliably, such apparatus are susceptible to damage from objects or undesirable items present at the floor surface of the body of water. Furthermore, depending upon the depth of the sediment removal operation being conducted, such apparatus are also susceptible to damage from objects buried in the sediment material beneath the floor surface. In order to prevent such damage, it is desirable to determine and locate the presence of such objects prior to conducting a dredging operation such that the dredging apparatus may be either maneuvered around or over such objects during operation thereof, or such objects may be retrieved and removed altogether prior to conducting the dredging operation.

There are some devices that are designed and constructed for locating objects under a body of water such as those devices that normally utilize some type of radar apparatus to locate objects under the body of water. Typically, such radar apparatus is attached to a towline and dragged along the floor surface of the body of water via a boat. In this situation, any sensor such as a global positioning system (GPS) sensor to identify the position of the object relative to the towed radar device would have to be located on the boat and a complex and expensive sonar system would be necessary to accurately determine the Cartesian (x, y and z) coordinates of the object. Furthermore, the weight of the radar apparatus usually causes such device to penetrate at least partially into the relatively soft and loose sediment material typically present at the floor surface of the particular body of water whereby the functioning of the device may be adversely impacted and/or the apparatus may be damaged from being dragged through the sediment material.

It is therefore desirable to provide an apparatus which can accurately locate objects under a body of water without utilizing complex and expensive sonar equipment to accurately determine the Cartesian (x, y and z) coordinates of such objects and which apparatus is unlikely to significantly penetrate the floor surface of the body of water during use.

Accordingly, the present invention is directed to overcoming one or more of the problems as set forth above.

DISCLOSURE OF THE INVENTION

In one aspect of the present invention, a apparatus adapted for locating objects under a body of water is disclosed. The apparatus includes a frame structure, at least one sensor assembly connected to the frame structure, wherein the sensor assembly includes a geographic location system receiver, such as a global positioning system (GPS) and an object detection device, such as ground penetrating radar. The geographic location system receiver being spaced a known distance from the object detection device, the object detection device being operable to detect a density change indicative of an object under the body of water, the object detection device being further operable to emit a signal indicative of the detection of an object under the body of water relative thereto based density change sensed thereby, and the geographic location system receiver being operable to emit a signal indicative of the present position of the receiver.

In another aspect of this invention, a method for locating objects under a body of water is disclosed. The method includes the steps of positioning in a body of water an apparatus operable to locate objects under the body of water, the apparatus including a geographic location system receiver and an object detection device spaced at a known distance relative to each other, detecting an object by sensing a change in density indicative of an object under a body of water, emitting a signal from the object detection device based upon a sensed density change indicative of a location of an object relative to the object detection device, sensing a signal indicative of the present position of the receiver by the geographic location system receiver, and emitting a signal indicative of the present position of the receiver by the receiver.

BRIEF DESCRIPTION OF THE DRAWINGS

For a better understanding of the present invention, reference may be made to the accompanying drawings in which:

FIG. 3 is a schematic illustration of one embodiment of an electronic control system constructed in accordance with the teachings of the present invention.

BEST MODE FOR CARRYING OUT THE INVENTION

Figure 1:
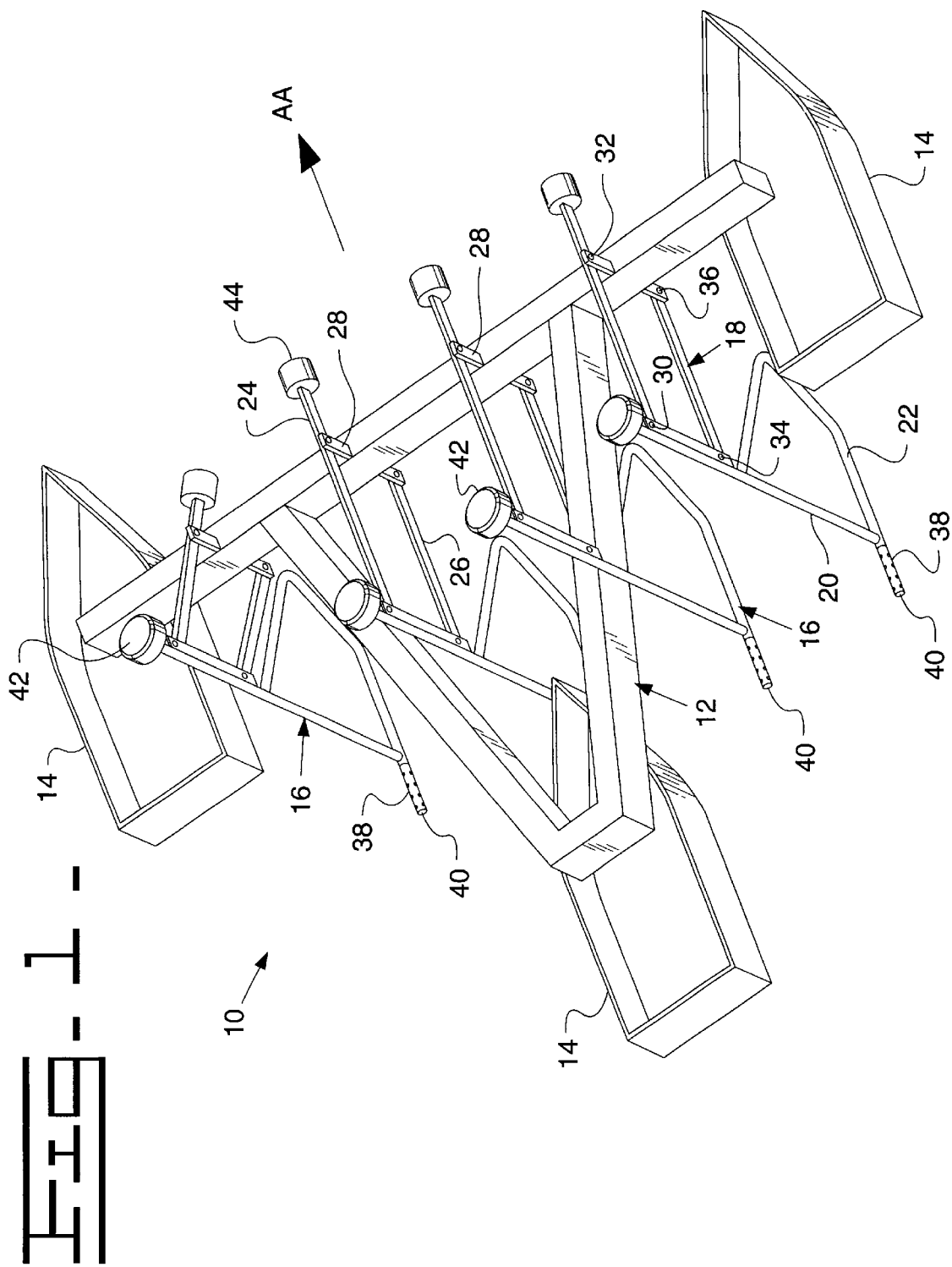
FIG. 1 is a perspective view of one embodiment of an apparatus constructed in accordance with the teachings of the present invention.
Figure 2:
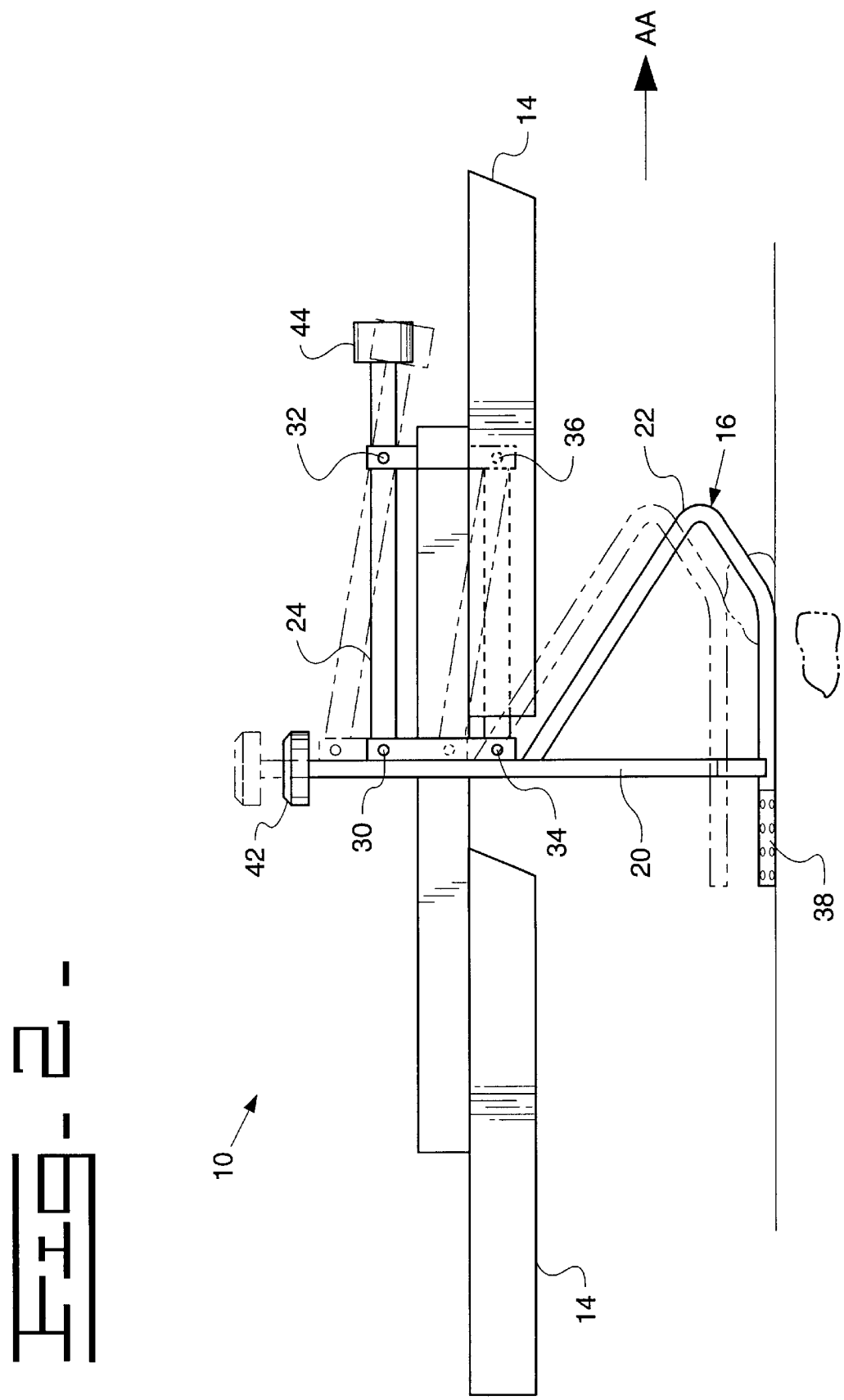
FIG. 2 is a side elevational view of the embodiment shown in FIG. 1 wherein one sensor assembly is shown in a first position on the floor surface of a body of water in solid outline form and in a second pivoted position traversing over an object located on the floor surface in phantom outline form.

Referring to the drawings and initially to FIGS. 1 and 2, which disclose an apparatus 10 for locating objects under a body of water in one embodiment of the present invention. Apparatus 10 includes a frame structure 12 substantially rigidly connected to a plurality of float devices 14. Float devices 14 may be any device adapted to float on a body of water and are illustrated as being substantially boat-like in shape in the embodiment depicted in FIG. 1. In the particular embodiment illustrated in FIG. 1, the present apparatus 10 includes three float devices 14, although it is recognized and anticipated that any number of float devices 14 may be used. Those skilled in the art will appreciate that the number of float devices 14 will typically depend on the size of frame structure 12 and the overall size of the float devices 14. Accordingly, as little as one float device 14 may suffice in a particular embodiment of the present invention, while any plurality of float devices 14 may be necessary in a comparatively larger embodiment. Frame structure 12 may be any frame structure known in the art and is preferably constructed of a lightweight material. Although the shape and construction of frame structure 12 illustrated in FIGS. 1 and 2 is specific, it is recognized and anticipated that a frame structure having a different shape and construction may be utilized without departing from the spirit and scope of the present invention. As those skilled in the art will appreciate, apparatus 10 will be carried on a body of water by virtue of float devices 14 and the vertical position of frame structure 12 should remain substantially constant relative to the surface of the water during the course of using the present apparatus 10 in a particular body of water.

At least one sensor assembly 16 is connected to frame structure 12. As best shown in FIGS. 1 and 2, each sensor assembly 16 comprises a parallelogram linkage 18, a rigid member 20, and an arm member 22. Parallelogram linkage 18 comprises an upper member 24, a lower member 26, a side member 28, and rigid member 20. Side member 28 is preferably substantially rigidly connected to frame structure 12 in a substantially vertical orientation. Upper member 24 is preferably connected pivotally to rigid member 20 and to side member 28 at pivot points 30 and 32 respectively, while lower member 26 is preferably connected pivotally to rigid member 20 and to side member 28 at pivot points 34 and 36 respectively. Further, upper member 24 is preferably substantially parallel to lower member 26, and rigid member 20 is preferably substantially parallel to side member 28. Those skilled in the art will appreciate that sensor assembly 16 in this embodiment may pivot with respect to frame structure 12 by virtue of pivot points 30, 32, 34 and 36. Further, when sensor assembly 16 does, in fact, pivot, opposite members of parallelogram linkage 18 will maintain their substantially parallel orientation with respect to each other. Particularly, upper member 24 will remain substantially parallel to lower member 26 and rigid member 20 will remain substantially parallel to side member 28. Accordingly, therefore, parallelogram linkage 18 will maintain a parallelogram shape in any pivoted orientation of sensor assembly 16. Further, because side member 28 is substantially rigidly connected to frame structure 12 in a substantially vertical orientation in the preferred embodiment, such substantially vertical orientation will be maintained at all times during operation and rigid member 20, being parallel thereto, will likewise maintain its substantially vertical orientation at all times during operation.

Arm member 22 in each sensor assembly 16 is an angled member as shown in FIGS. 1 and 2, and is substantially rigidly connected to rigid member 20. The angled shape of member 22 serves a purpose as will be hereinafter further discussed below. An object detection device 38 is positioned near an end 40 of arm member 22. In the preferred embodiment, the object detection device is a ground penetrating radar (GPR) device. GPR device 38 is operable to emit radar waves and to sense radar waves that are reflected back by an object in the path of the radar waves. Radar devices such as GPR device 38 are well known in the art and such devices can not only locate the position of an object relative to such devices, but such devices can also produce a reflection of the object as well. GPR device 38 is preferably operable to detect objects buried at least 6 feet under the floor surface of a body of water, and to emit a signal indicative of the location and shape of such objects relative to GPR device 38. It is recognized and anticipated that other GPR devices having a capability of detecting objects at a greater depth, or at a shallower depth, may likewise be implemented in other embodiments of the present invention without departing from the spirit and scope of the present invention. Further, the depth capability of GPR device 38 may preferably be customized according to the requirements of a particular application or a particular body of water. Although the preferred embodiment utilizes GPR as the object detection device 38, other object detection means (i.e. sonar, magnets, magnetic induction sensors, etc.) may likewise be implemented in other embodiments of the present invention without departing from the spirit and scope of the present invention.

Each sensor assembly 16 also includes a geographic location system receiver 42 positioned on rigid member 20. In the preferred embodiment, the geographic location system receiver is a global positioning system (GPS), however other geographic location systems (i.e. laser position, RADAR and mechanical mechanisms, etc.) may likewise be implemented in other embodiments of the present invention without departing from the spirit and scope of the present invention. GPS receivers such as receiver 42 are well known in the art and are typically operable to emit a signal indicative of the present position of the receiver with reference to a global scale, or a particular geographical location on the surface of the earth, which is usually facilitated by a set of geosynchronous satellites orbiting in space. It may be appreciated that the position of GPS receiver 42 relative to GPR device 38 is known and constant, and such relative position will remain known or constant regardless of the pivotable variation of the position of sensor assembly 16 with respect to frame structure 12. Also, although GPR device 38 is located under the water, GPS receiver 42 must be located above the surface of the water. As such, the length of member 20 is selected accordingly to achieve this objective. Furthermore, a counterweight 44 is preferably connected to one end of upper member 24 as depicted in FIGS. 1 and 2, the purpose of which is discussed hereinbelow.

Prior to operation, apparatus 10 is positioned in a body of water. When thus positioned, sensor assemblies 16 will be suspended in the water below frame structure 12, and frame structure 12 will preferably stay at a uniform or constant position relative to the surface of the water by virtue of float devices 14. With apparatus 10 thus positioned in the body of water, the vertical depth of end 40 of the respective sensor assemblies 16 is preferably greater than the average depth of the floor surface of the body of water whereby each end 40 will usually come in contact with the floor surface of the body of water. Contact of end 40 with the floor surface will result in an upward force being exerted against sensor assembly 16, which upward force will cause sensor assembly 16 to pivot relative to frame structure 12. The weight of sensor assembly 16 is preferably substantially countered by counterweight 44 whereby the resulting net downward force of sensor assembly 16 upon the floor surface of the body of water is minimal. Such weight or downward force in the preferred embodiment is about two pounds. Those skilled in the art will appreciate that counterweight 44 can be varied to counteract the weight of end 40 upon the floor surface in order to prevent end 40 of arm portion 22 from significantly penetrating the comparatively soft sediment material typically present at the floor surface of a body of water.

During operation, apparatus 10 is moved relative to the floor surface of the body of water in a direction shown by arrow AA in FIGS. 1 and 2. Such movement can be accomplished by incorporating known propulsion means with the apparatus 10, such as by associating a propulsion member with one or more of the float members 14, or by towing the apparatus 10 with a boat or other vessel. When apparatus 10 thus moves, end 40 of each arm member 22 should follow the contour of the floor surface because the downward force of the sensor assembly 16, although minimal, will cause end 40 to ride along the floor surface without significantly penetrating such surface. As a result, each sensor assembly 16 will be able to pivot to conform to the depth of the floor surface. Accordingly, sensor assembly 16 will pivot and move upwardly when the height of the floor surface increases, and it will pivot and move downwardly when the height of the floor surface decreases. It may further be appreciated that when apparatus 10 moves in the direction indicated by arrow AA in FIGS. 1 and 2, the angled shape of arm member 22 will facilitate the pivotable variation of the vertical height of end 40, and therefore the vertical height of sensor assembly 16, by riding on the floor surface and over any objects located thereon. In the event that an object is encountered on the floor surface of a body of water such as a rock, a vehicle tire, or the like, or if there is an abrupt change in the contour of the floor surface, sensor assembly 16 will not snag upon the object or the floor surface, but instead, will be able to traverse over the obstacle due to the angled shape of arm member 22 as shown in phantom outline form in FIG. 2.

During operation, GPR device 38 is operable to emit radar waves and to sense radar waves reflected back by an object present on the floor surface or buried in the sediment material. As discussed, GPR device 38 in the preferred embodiment is operable to detect objects buried up to about six feet under the floor surface of the water, although such depth can vary in other embodiments of the present invention.

Referring to FIG. 3, when an object is detected by GPR device 38, device 38 preferably emits a signal 46 indicative of the position of the object relative thereto. GPR device 38 is preferably coupled to an electronic control module (ECM) 48 which is operable to receive signal 46. Electronic controllers or modules such as ECM 48 are commonly used in association with machines and apparatus for determining or calculating values, and for controlling various functions and tasks such as monitoring and controlling a wide variety of mechanical functions such as engine speed, torque, and so forth. Controllers and electronic modules such as ECM 48 are typically utilized for delivering signals to devices such as motor controllers, hydraulic cylinders, pumps, and a wide variety of other mechanical components to control the operation of a particular device or component associated therewith, or to provide a data output thereto indicative of a particular value. However, they may also be used to collect data and store or preserve it in a memory means or a data recordation means associated therewith. In this regard, ECM 48 will typically include processing means such as a microcontroller or a microprocessor, associated electronic circuitry such as input/output circuitry, analog circuits, digital circuits, programmed logic arrays, associated memory means, disk drives, and other data recordation or peripheral devices. ECM 48 and its associated electronic equipment or other devices can be located and housed anywhere on the apparatus 10 such as in association with any one of the float devices 14, or at a remote location as further discussed below.

Upon receiving signal 46 from GPR device 38 indicative of the location of an object detected under the body of water, ECM 48 will also sense a signal 50 from GPS receiver 42 indicative of the present position of receiver 42 on a global scale. GPS receiver 42 preferably emits signal 50, either constantly or at predetermined fixed time intervals, indicative of the present geographical position of the receiver 42 whereby ECM 48 may sense signal 50 and thus be able to determine the present location of GPS receiver 42. Upon sensing signals 46 and 50, ECM 48 can accurately determine the location of the object under the body of water because the global position of GPS receiver 42 will be known from signal 50, the position of the object relative to GPR device 38 will be known from signal 46, and the position of the GPR device 38 relative to GPS receiver 42 will be a fixed predetermined known value which may be programmed into software associated with ECM 48 or may be made available to ECM 48 via a memory means or other data storage means associated therewith. Having thus determined the precise location of the object detected, ECM 48 preferably outputs a signal 52 indicative of the x, y and z coordinates of that object to an appropriate receiving means 54 as discussed below. ECM 48 can also output a signal 52 indicative of both the location and shape of the object to a computer which, in turn, can produce a map showing the shape and location of the object relative to the floor surface for easy retrieval thereof.

INDUSTRIAL APPLICABILITY

As described herein, the method and apparatus of the present invention has particular utility in all types of marine operations wherein it is desirable to accurately locate the presence of objects under a body of water. Typically, the present apparatus 10 may be operated independently to locate objects prior to conducting marine operations such as dredging operations, or the apparatus 10 may be associated with other apparatus operable to conduct marine operations.

It may be appreciated that the object location data determined by ECM 48 and contained in signal 52 may be recorded in a memory means associated therewith, or such data may be recorded on a disk or other data storage means associated with ECM 48, or separate and apart therefrom. In one embodiment of the present invention, such data is recorded and may be utilized at a later time for retrieving the located objects and removing them from the body of water. However, ECM 48 may also emit signal 52 indicative of the object's location to a control system associated with a dredging apparatus following therebehind, which control system would, in turn, output a signal to the dredging wheel mechanism of the dredging apparatus to maneuver around or over the located object. In yet another embodiment, signal 52 may be emitted to an object removal apparatus following behind apparatus 10, which object removal apparatus may be operable to retrieve and remove the object from the body of water. Still further, ECM 48 and other appropriate receiving devices may be located separate and apart from apparatus 10, such as at a remote location or on a dredging apparatus, and GPR device 38 and GPS receiver 42 may merely output their respective signals 46 and 50 to the remote location for receipt by ECM 48 or other appropriate devices. Also, appropriate signal or data recording means may be located on apparatus 10 or at a remote location for receiving the output signals 46 and 50 from GPR device 38 and GPS receiver 42 respectively and such recording means will preserve and/or store the data indicated by such signals 46 and 50 for subsequent use by ECM 48 or other appropriate means. Accordingly, all such embodiments of the present invention having an appropriate receiving means for receiving signals 46, 50 and 52 are anticipated and recognized, and it is intended that the claims shall cover all such embodiments that do not depart from the spirit and scope of the present invention.

The number of sensor assemblies 16 in a particular embodiment of the present apparatus 10 is also preferably variable. It may be appreciated that the greater the number of sensor assemblies 16 in an embodiment of apparatus 10, the wider the range of area such embodiment may cover during a sensing operation, and vice versa. Thus, depending upon the area desired to be covered, the number of sensor assemblies 16 coupled to frame structure 12 may be adjusted accordingly.

Those skilled in the art will appreciate that the parallelogram shape of parallelogram linkage 18 is maintained when each sensor assembly 16 pivots or otherwise moves. Furthermore, such pivoting does not alter the position of GPS receiver 42 with respect to GPR device 38, which relative position is critical to the accurate determination of the location of an object detected by GPR device 38. At any pivoted position of sensor assembly 16, the position of GPS receiver 42 will remain fixed with respect to GPR device 38 and such position is predetermined and available to ECM 48 during operation as discussed above.

It is also recognized that variations to the operating steps for practicing the present invention can be made without departing from the spirit and scope of the present invention. In particular, steps could be added or some steps could be eliminated. All such variations are intended to be covered by the present invention.

As is evident from the foregoing description, certain aspects of the present invention are not limited by the particular details of the examples illustrated herein, and it is therefore contemplated that other modifications and applications will occur to those skilled in the art. It is accordingly intended that the claims shall cover all such modifications and applications, or any equivalents thereof, that do not depart from the sprit and scope of the present invention.

Other aspects, objects and advantages of the present invention can be obtained from a study of the drawings, the disclosure and the appended claims.

What is claimed is:

1. An apparatus (10) for locating objects under a body of water comprising:
   a frame structure (12);
   at least one sensor assembly (16) connected to said frame structure (12), said at least one sensor assembly (16) including a geographic location system receiver (42) and an object detection device (38);
   said geographic location system receiver (42) being spaced a known distance from said object detection device (38) by a rigid member (20);
   said object detection device (38) being operable to detect an object unde the body of water, said object detection device (38) being further operable to emit a signal (16) indicative of the detection of an object under the body of water relative thereto; and
   said geographic location system receiver (42) being operable to emit a signal (50) indicative of the present position of said receiver.

2. The apparatus (10) as set forth in claim 1, wherein said frame structure (12) includes at least one float device (14), said float device (14) being movable with respect to the body of water.

3. The apparatus (10) as set forth in claim 1, wherein said a least one sensor assembly (16) further includes a parallelogram linkage (18), said parallelogram linkage (18) including:
   a side member (28) substantially rigidly connected to said frame structure (12);
   an upper member (24) pivotally connected to said side member (28) at a first pivot location (32);
   a lower member (26) pivotally connected to said side member (28) at a second pivot location (36);
   said rigid member (20) being pivotally connected to said upper member (24) at a third pivot location (30), and pivotally connected to said lower member (26) at a fourth pivot location (34); and
   said sensor assembly (16) being pivotable with respect to said frame structure (12) by virtue of said first (32), second (36), third (30), and fourth (34) pivot locations.

4. The apparatus (10) as set forth in claim 3, wherein said side member (28) and said rigid member (20) are substantially parallel to each other, and such members (20, 28) maintain such substantially parallel relationship with respect to each other at any pivoted orientation of said sensor assembly (16).

5. The apparatus (10) as set forth in claim 3, wherein said upper member (24) and said lower member (26) are substantially parallel to each other, and such members (24, 26) maintain such substantially parallel relationship with respect to each other at any pivoted orientation of said sensor assembly (16).

6. The apparatus (10) as set forth in claim 3, wherein said upper member (24) has a counterweight (44) associated therewith to counteract a downward force associated with said sensor assembly (16).

7. The apparatus (10) as set forth in claim 3, wherein said geographic location system receiver (42) is associated with said rigid member (20).

8. The apparatus (10) as set forth in claim 3, wherein said sensor assembly (16) includes an arm member (22) coupled to said rigid member (20), said arm member (22) including said object detection device (38).

9. The apparatus (10) as set forth in claim 8, wherein said arm member (22) is angularly shaped so as to more easily traverse over an object located on a floor surface of the body of water.

10. The apparatus (10) as set forth in claim 1, further including an electronic controller (48) coupled to said geographic location system receiver (42) and said object detection device (38) to receive signals therefrom, said electronic controller (48) being operable to determine the location of an object under the body of water based upon the signals (46, 50) received from said geographic location system receiver (42) and said object detection device (38).

11. The apparatus (10) as set forth in claim 10, wherein said electronic controller (48) emits a signal (52) indicative of the location of an object under the body of water.

12. The apparatus (10) as set forth in claim 10, wherein said electronic controller (48) is operable to store the location of an object detected under the body of water in a memory means (54) associated therewith.

13. The apparatus (10) as set forth in claim 10, wherein said electronic controller (48) is operable to store the location of an object detected under the body of water in a data recording means (54) associated therewith.

14. The apparatus (10) as set forth in claim 1, further including an electronic controller (48) adapted to receive the signals (46, 50) emitted by said geographic location system receiver (42) and said object detection device (38), said electronic controller (48) being operable to determine the location of an object under the body of water based upon the signals (46, 50) received from said geographic location system receiver (42) and said object detection device (38).

15. The apparatus (10) as set forth in claim 1, wherein said geographic location system receiver (42) is a Global Position System (GPS) receiver.

16. The apparatus (10) as set forth in claim 1, wherein said object detection device (38) is a ground penetrating radar (GPR) device;
   said ground penetrating radar device being operable to emit radar waves and to sense radar waves reflected by an object under the body of water, said ground penetrating radar device (38) being further operable to emit a signal (46) indicative of the location of an object under the body of water relative thereto based upon reflected radar waves sensed thereby.

17. An apparatus (10) for locating objects under a body of water comprising:
- at least one float device (14) operable to float in the body of water and movable with respect to a floor surface of the body of water;
- a frame structure (12) connected to said at least one float device (14);
- at least one sensor assembly (16) pivotally connected to said frame structure (12), said at least one sensor assembly (16) including a parallelogram linkage (18) connected to said frame structure (12);
- said parallelogram linkage (18) including a side member (28) substantially rigidly connected to said frame structure (12), an upper member (24) pivotally connected to said side member (28), a lower member (26) pivotally connected to said side member (28), and a rigid member (20) pivotally connected to said upper member (24) and said lower member (26);
- an arm member (22) connected to said rigid member (20);
- an object detection device (38) associated with said arm member (22), said object detection device (38) being operable to detect an object under the body of water, said object detection device (38) being further operable to emit a signal (46) indicative of the detection of an object under the body of water relative thereto;
- a geographic location system receiver (42) associated with said rigid member (20), said geographic location system receiver (42) being operable to emit a signal (50) indicative of the position of said receiver (42); and
- an electronic controller (48) coupled to said geographic location system receiver (42) and to said object detection device (38), said electronic controller (48) being operable to receive said signals (46, 50) from said geographic location system receiver (42) and said object detection device (38) and to determine the location of an object under the body of water based upon said signals (46, 50), said electronic controller (48) being further operable to output a signal (52) indicative of the location of an object under the body of water.

18. The apparatus (10) as set forth in claim 17, wherein said side member (28) is substantially rigidly connected to said frame structure (12) in a substantially vertical orientation.

19. The apparatus (10) as set forth in claim 17, wherein said side member (28) and said rigid member (20) are substantially parallel to each other and said members (20, 28) maintain such substantially parallel relationship with respect to each other at any pivoted orientation of said sensor assembly (16).

20. The apparatus (10) as set forth in claim 17, wherein said upper member (24) and said lower member (26) are substantially parallel to each other and said members (24, 26) maintain such substantially parallel relationship with respect to each other at any pivoted orientation of said sensor assembly (16).

21. The apparatus (10) as set forth in claim 17, wherein said upper member (24) includes a counterweight (44) to counteract a downward force associated with said sensor assembly (16).

22. The apparatus (10) as set forth in claim 17, wherein said electronic controller (48) is operable to store the location of an object detected under the body of water in a memory means (54) associated therewith.

23. The apparatus (10) as set forth in claim 17, wherein said electronic controller (48) is operable to store the location of an object detected under the body of water in a data recording means (54) associated therewith.

24. The apparatus (10) as set forth in claim 17, wherein said arm member (22) is angularly shaped so as to more easily traverse over an object located on the floor surface of the body of water.

25. The apparatus (10) as set forth in claim 17, wherein the distance between said geographic location system receiver (42) and said object detection device (38) remains substantially constant at any pivoted orientation of said sensor assembly (16).

26. The apparatus (10) as set forth in claim 17, wherein said geographic location system receiver (42) is located above the body of the water and said object detection device (38) is located in the body of water.

27. The apparatus (10) as set forth in claim 17, wherein said object detection device (38) is further operable to output a signal (46) indicative of the shape of an object located under the body of water.

28. The apparatus (10) as set forth in claim 17, wherein said geographic location system receiver (42) is a Global Position System (GPS) receiver.

29. The apparatus (10) as set forth in claim 17, wherein said object detection device (38) is a ground penetrating radar (GPR) device;
- said ground penetrating radar device being operable to emit radar waves and to sense radar waves reflected by an object under the body of water, said ground penetrating radar device (38) being further operable to emit a signal (46) indicative of the location of an object under the body of water relative thereto based upon reflected radar waves sensed thereby.

30. A method for locating objects under a body of water comprising the steps of:
- positioning in a body of water an apparatus (10) operable to locate object under the body of water, said apparatus (10) including a geographic location system receiver (42) and a object detection device (38) spaced at a known distance relative to each other;
- detecting an object by said object detection device (38);
- emitting a signal (46) by said object detection device (38) indicative of a location of an object relative to said object detection device (38);
- sensing a signal (50) indicative of the present position of said receiver (42) by said geographic location system receiver (42); and
- emitting a signal (50) indicative of the present position of said receiver (42) by said receiver (42).

31. The method as set forth in claim 30 further comprising the steps of:
- providing an electronic controller (48) adaptable for receiving signals from said object detection device (38) and said geographic location system receiver (42); and
- said electronic controller (48) receiving said signals (46, 50) emitted by said object detection device (38) and said receiver (42).

32. The method as set forth in claim 31, wherein said electronic controller (48) determines the location of an object under the body of water.

33. The method as set forth in claim 32, wherein said electronic controller (48) emits a signal (52) indicative of the location of an object under the body of water.

34. The method as set forth in claim 32, further comprising the step of storing the location of an object detected under the body of water in a data recording means (54).

35. The method as set forth in claim 32, further comprising the step of storing the location of an object detected under the body of water in a memory means (54).

36. The method as set forth in claim 30, wherein said object detection device (38) is a ground penetrating radar system and wherein said geographic location system receiver (42) is a global positioning system receiver; and emitting radarwaves by said object detection device (38);

sensing radar waves emitted by the ground penetrating radar device and reflected by an object under the body of water;

emitting a signal (46) by the ground penetrating radar device based upon the sensed radar waves indicative of a location of an object relative to the ground penetrating radar device;

sensing a signal (50) indicative of the present position of the global positioning receiver by the global positioning system receiver; and emitting a signal (50) indicative of the present position of the global positioning system receiver by the global positioning system receiver.

* * * * *